(12) United States Patent
Hampapur et al.

(10) Patent No.: US 7,215,359 B2
(45) Date of Patent: May 8, 2007

(54) TECHNIQUES FOR VIEW CONTROL OF IMAGING UNITS

(75) Inventors: Arun Hampapur, Norwalk, CT (US); Martin G. Kienzle, Briarcliff Manor, NY (US); Sharathchandra U. Pankanti, Rego Park, NY (US); Andrew William Senior, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 434 days.

(21) Appl. No.: 10/933,660

(22) Filed: Sep. 3, 2004

(65) Prior Publication Data

US 2006/0061653 A1  Mar. 23, 2006

(51) Int. Cl.
*H04N 5/30* (2006.01)
(52) U.S. Cl. ......................................... 348/143; 348/36
(58) Field of Classification Search .................... None
See application file for complete search history.

(56) References Cited

U.S. PATENT DOCUMENTS 5,877,801 A     3/1999 Martin et al.
5,898,459 A     4/1999 Smith et al.
6,215,519 B1    4/2001 Nayar et al.
6,226,035 B1    5/2001 Korein et al.
6,614,474 B1    9/2003 Malkin et al.

FOREIGN PATENT DOCUMENTS

EP          0970583 A4      3/2000

*Primary Examiner*—Paul W. Huber
(74) *Attorney, Agent, or Firm*—Ryan, Mason & Lewis, LLP

(57) ABSTRACT

Techniques are presented for controlling views of plurality of imaging units, where each imaging unit outputs a feed comprising video. A set of parameters are determined, and the set of parameters defines a given selected view of a region able to be visually covered by the plurality of imaging units. The given selected view is one of a plurality of predetermined selected views of the region. Each of the plurality of selected views corresponds to a portion of the region and to one or more of the imaging units able to visually cover the portion of the region. Further, each selected view is defined by a corresponding set of parameters. It is determined which of the one or more feeds correspond to the given selected view, and the one or more feeds that correspond to the given selected view are output.

29 Claims, 6 Drawing Sheets

FIG. 6

CIU VIEW TO IU MAPPING TABLE (600)

| | |
|---|---|
| PAN, TILT, ZOOM (610-1) | IU1, IU2, IU3 (620-1) |
| PAN, TILT, ZOOM (610-2) | IU2 (620-2) |
| ⋮ | ⋮ |
| PAN, TILT, ZOOM (610-M) | IU4, IU5, IU6 (620-M) |

Rows: 630-1, 630-2, ..., 630-M

FIG. 7

RULES TABLE (700)

| 610-1 | |
|---|---|
| PAN, TILT, ZOOM | IF OBJECT MOVING TOWARD CIU VIEW OF PAN BETWEEN A TO B, SELECT IU1 (710-1) |
| | IF OBJECT MOVING TOWARD CIU VIEW OF PAN NOT BETWEEN A TO B AND TILT BETWEEN C TO D, SELECT IU3 (710-2) |
| | OTHERWISE, SELECT IU2 (710-3) |

IU PARAMETER TABLE (800)

| 610-1 | |
|---|---|
| PAN, TILT, ZOOM | IU1: PAN, TILT, ZOOM (810) |
| | IU2: PAN, TILT, ZOOM (820) |
| | IU3: ZOOM (830) |

840

TECHNIQUES FOR VIEW CONTROL OF IMAGING UNITS

FIELD OF THE INVENTION

The present invention relates to video and, more particularly, relates to control of imaging units that produce video feeds.

BACKGROUND OF THE INVENTION

Pan-tilt units are used to position, aim, steer or otherwise orient an imaging unit, such as a digital camera, into a desired direction by moving the imaging unit about two perpendicular axes. One common application is the field of surveillance and security, where an imaging unit is mounted to a pan-tilt unit that can be controlled or programmed to scan a desired area.

Pan-tilt movement is conventionally accomplished using separate motors that independently perform the pan and tilt operations. For example, a pan-tilt unit generally includes a pan motor for rotating the device about a pan axis, and a tilt motor for rotating the device about a tilt axis that is perpendicular to the pan axis.

In many applications, multiple imaging units in an imaging system are used to survey a particular area. Each imaging unit has a particular field of view, which is the area visible through the lens or lens system of the imaging unit. Because each camera has a particular field of view, there may be situations when the entire area cannot be viewed at the same time. This was particularly true in the past as imaging units used to be quite expensive. Consequently, having a pan-tilt unit on one or multiple cameras allowed fewer cameras to be used to survey an area. If the imaging system is designed so that certain combinations of pan and tilt values for imaging units allow the fields of view of some of the imaging units to overlap or come close, then the area can be scanned in an efficient manner.

Therefore, while these types of imaging systems can therefore be efficient and relatively inexpensive, there are certain problems with these systems. Accordingly, there is a need to provide improvements for imaging systems.

SUMMARY OF THE INVENTION

The present invention provides techniques for view control of a number of imaging units.

In a first aspect of the invention, techniques are presented for controlling views of plurality of imaging units, where each imaging unit outputs a feed comprising video. A set of parameters are determined, and the set of parameters defines a given selected view of a region able to be visually covered by the plurality of imaging units. The given selected view is one of a plurality of predetermined selected views of the region. Each of the plurality of selected views corresponds to a portion of the region and to one or more of the imaging units able to visually cover the portion of the region. Further, each selected view is defined by a corresponding set of parameters. It is determined which of the one or more feeds correspond to the given selected view, and the one or more feeds that correspond to the given selected view are output.

A more complete understanding of the present invention, as well as further features and advantages of the present invention, will be obtained by reference to the following detailed description and drawings.

BRIEF DESCRIPTION OF THE DRAWINGS

FIG. 6 shows an exemplary composite imaging unit view to imaging unit mapping table, in accordance with an exemplary embodiment of the present invention;

FIG. 7 shows an exemplary rules table, in accordance with an exemplary embodiment of the present invention; and FIG. 8 shows an exemplary imaging unit parameter table, in accordance with an exemplary embodiment of the present invention.

DETAILED DESCRIPTION OF PREFERRED EMBODIMENTS

For ease of reference, the present disclosure is divided into an Introduction section, which further describes problems with conventional imaging systems, and an Exemplary Embodiments section, which describes illustrative embodiments of the present invention.

Introduction

One limitation of existing pan-tilt units is that these units suffer from significant electromechanical inertia in their control mechanisms and consequently there is considerable lag in orienting an imaging unit, such as a camera, to which the pan-tilt unit is connected. That is, there is significant delay between the time when a control command is issued to the pan-tilt unit and the time when the imaging unit is actually pointing to the desired location specified by the control command. In other words, speed of pan or tilt or both of an imaging unit is presently limited by mechanical inertia. For example, it takes about one second to move 10 degrees in electromechanical cameras and about 0.3 seconds in electro-magnetic-mechanical operation of cameras. Additionally, angular speed of the imaging unit is inversely proportional to distance of an object, directly proportional to object speeds, and related to direction of object velocity with respect to the imaging unit. Thus, relatively small motions of an object can require fast angular speeds of camera motion.

Another limitation of the present pan-tilt units is that, at any given resolution, the coverage region offered by the imaging unit mounted on the pan tilt unit is limited. A coverage region is a region able to be visually covered by the imaging unit. For instance, a field of view of the imaging unit is one example of a coverage region.

Figure 1A:
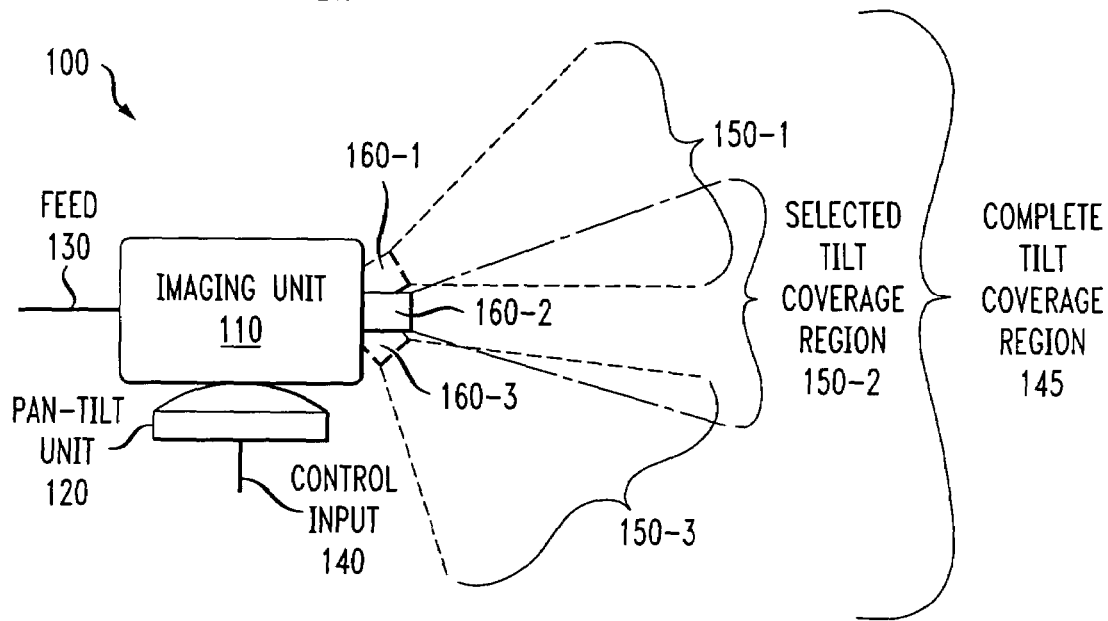
FIG. 1A shows a block diagram of a side view of a single imaging unit of an imaging system in a number of tilt positions.

Turning now to FIG. 1A, an imaging system 100 comprises an imaging unit 110 that includes a pan-tilt unit 120. FIG. 1A shows a side view of the imaging system 100. The pan-tilt unit 120 responds to a control input 140. The imaging unit 110 produces a feed 130 comprising video. The imaging unit 110 can have a visual coverage of a complete tilt coverage region 145 by mounting the imaging unit on the pan-tilt unit 120 that is responsive to the control input 140. The imaging unit 110 can be moved into a number of tilt positions, of which three tilt positions 160-1, 160-2 and 160-3 are shown. The tilt positions 160-1 and 160-3 are equivalent to the maximum tilts (e.g., "up" and "down") for the pan-tilt unit 120. The tilt position 160-1 correlates with a selected coverage region of 150-1. Similarly, the tilt position 160-2 correlates with a selected coverage region of 150-2, and the tilt position 160-3 correlates with a selected coverage region of 150-3. Different values on the control input 140 result in different selected fields of view 150, thus resulting in a large visual coverage of complete tilt coverage region 145.

Figure 1B:
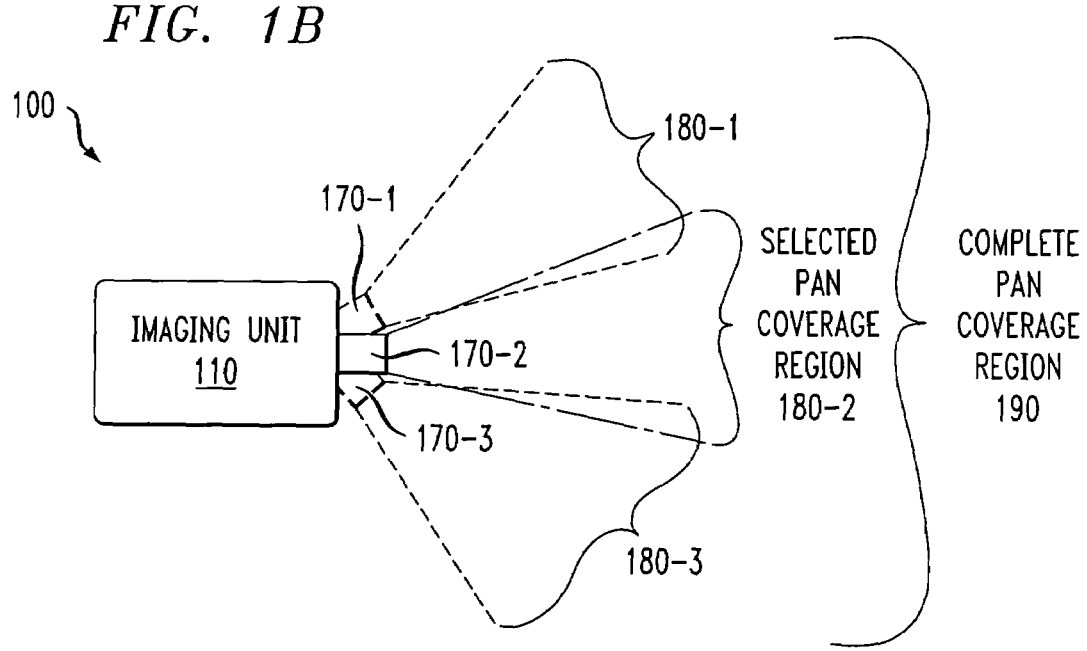
FIG. 1B shows a block diagram of a top view of a single imaging unit of an imaging system in a number of pan positions.

FIG. 1B shows a top view of imaging system 100. The imaging unit 110 has a visual coverage of a complete pan coverage region 190 by using the pan-tilt unit 120 (not shown in FIG. 1B). The imaging unit 110 can be moved into a number of pan positions, of which the pan positions 170-1, 170-2 and 170-3 are shown. The pan positions 170-1 and 170-3 are equivalent to the maximum pans (e.g., to the "right" and "left") for the pan-tilt unit 120. The pan position 170-1 correlates with a selected coverage region of 180-1. Similarly, the pan position 170-2 correlates with a selected coverage region of 180-2, and the pan position 170-3 correlates with a selected field of view of 190-3.

Figure 1C:
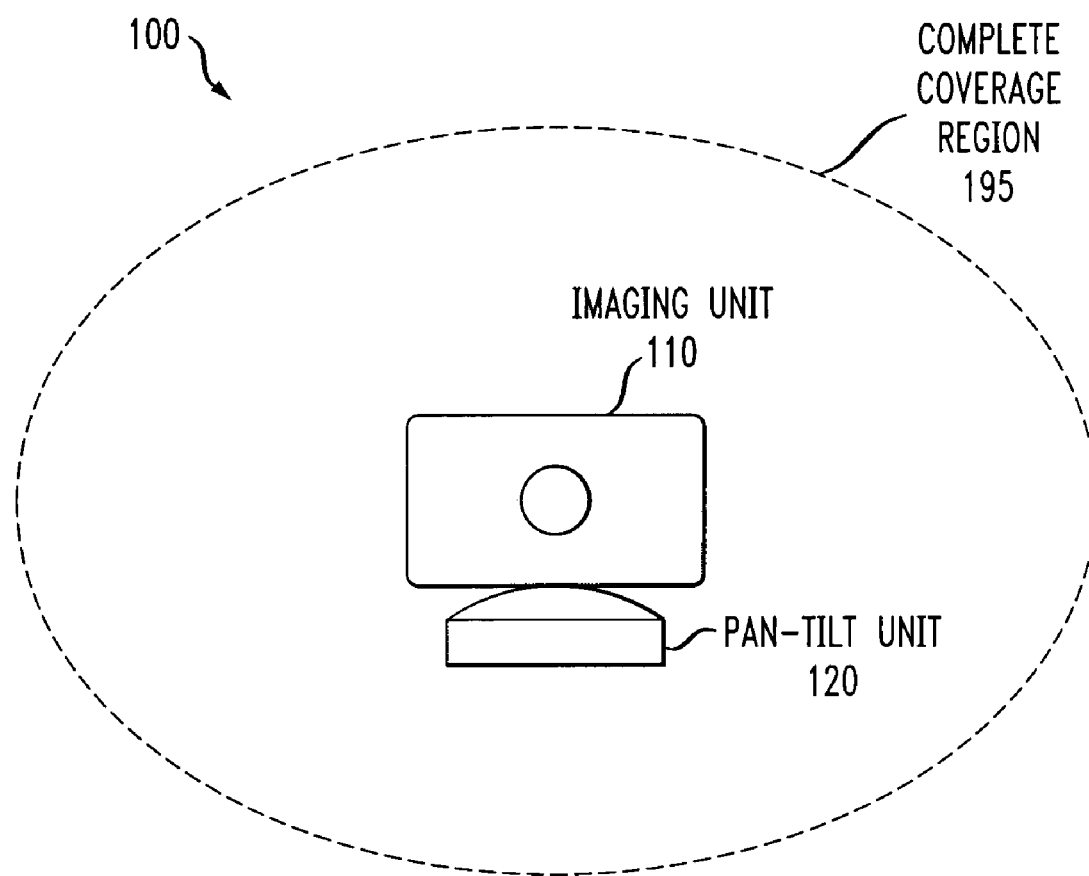
FIG. 1C shows a block diagram of a front view of a single imaging unit in an imaging system.

Although tilt (FIG. 1A) and pan (FIG. 1B) are shown operating independently, both tilt and pan can be changed at the same time. FIG. 1C shows a front view of imaging unit 110 and pan-tilt unit 120 and shows an exemplary complete coverage region 195, which is created by a combination of tilt and pan values for the pan-tilt unit 120.

As described above, the movement of the imaging system 100 from one pan-tilt position to the next is slow because of the electromechanical inertia of the pan-tilt unit 120 and the imaging unit 110. Thus, there is a demand for faster operation of imaging units.

Exemplary Embodiments

The present invention provides faster operation of imaging units by operating a number of imaging units as if the imaging units were a single imaging unit such as imaging unit 110. A "composite imaging unit" is created from the number of imaging units and is part of a composite imaging system. With a number of imaging units, a composite imaging system can very quickly change selected coverage regions of the composite imaging unit by selecting one or more feeds from the number of imaging units. The composite imaging system can therefore act like one imaging unit even though the composite imaging system comprises a number of imaging units.

Figure 2:
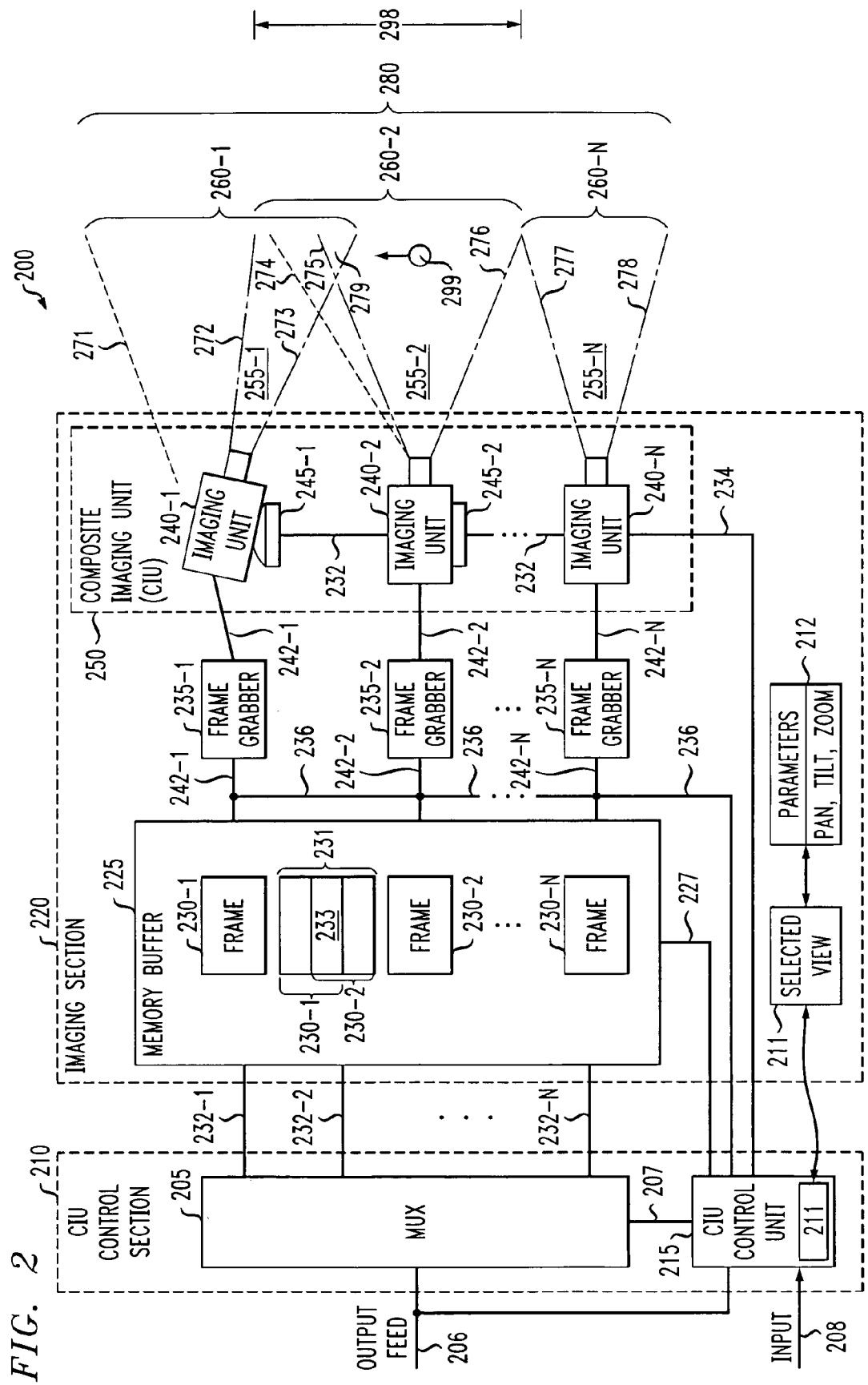
FIG. 2 shows a block diagram of an exemplary composite imaging system in accordance with an exemplary embodiment of the present invention.

Turning now to FIG. 2, an exemplary composite imaging system 200 is shown. Composite imaging system 200 comprises a Composite Imaging Unit (CIU) section 210 coupled to an imaging section 220. The composite imaging system 200 receives information on an input 208 and produces an output feed 206. The CIU control section 210 comprises a multiplexer (MUX) 205 and a CIU control unit 215. The imaging section 220 comprises a memory buffer 225, N frame grabbers 235, and a composite imaging unit 250. The composite imaging unit 250 comprises N imaging units 240, each of which produces a feed 242 comprising video. Certain of the imaging units 240 may comprise pan-tilt units 245 (e.g., the imaging unit 240-1 comprises a pan-tilt unit 245-1). An imaging unit 240 can be any device suitable for taking images of a region, such as an analog or digital camera, infrared camera, or charge-coupled device (CCD). An imaging unit 240 can also include microphones and other sound recording devices.

Each imaging unit 240 has a selected coverage region 255 that is defined by the imaging unit 240 and values associated with a corresponding pan-tilt unit 245 (if any). Additionally, a selected coverage region 255 may also be at least partially defined by a value for zoom, if the imaging unit 240 has a zoom feature. The memory buffer 225 comprises a number of frames 230, each of which corresponds to a frame of video from a corresponding imaging unit 240. The frames 230 may also comprise additional information, such as sound, time stamps, or sequence stamps.

The frame grabbers 235 are used, in an illustrative embodiment, to convert analog signals into digital frames 230 comprising video. The memory buffer 225 allows, in an exemplary embodiment, the frames to be stored prior to being transferred to the MUX 205. The storage allows the frames to be operated on or examined. For instance, in the example of FIG. 2, the selected coverage region 255-1 of the imaging unit 240-1 overlaps with the selected coverage region 255-2 of the imaging unit 240-2. The frame 231 is a frame comprising overlapping frames 230-1 and 230-2, which are from feeds 242-1 and 242-2, respectively. Processing may be used on overlap area 233. For instance, when switching from imaging unit 240-2 to imaging unit 240-1, processing could eliminate some artifacts so that the switch appears without a motion jitter artifacts in the image. The memory buffer 225 could perform this processing, or the CIU control unit 215 could perform the processing and supply the memory buffer 225 with the frame 231 through the connection 227.

The CIU control unit 215 acts to control the imaging units 240 through imaging unit control 234. There could be, e.g., one imaging unit control 234 that runs to all of the imaging units 240 or there could be one imaging unit control 234 for each of the imaging units 240. The imaging unit control 234 supplies pan, tilt, and zoom values to the imaging units 240. A particular imaging unit 240 may need none, some or all of the pan, tilt, and zoom values. For instance, imaging unit 240-N in this example does not have a pan-tilt unit 245 and therefore does not need pan or tilt values. The CIU control unit 215 may also operate on video feeds by using feed coupling 236, which could be, e.g., one coupling for all feeds 242 or one coupling for each feed 242. It is within the scope of the present invention to have the CIU control unit 215 accept an independent video feed (e.g., a wide angle view camera) from an external (e.g., legacy) system for facilitating the processing. The operations could include processing of frames 230. For instance, further processing can be performed on video in a feed 242 to depict a scene as if the scene were coming from a traditional pan-tilt imaging system (e.g., the object of interest could be centered in the video output on a feed 242). Additional operations include object tracking (for instance, of object 299).

The CIU control unit 215 directs, through MUX control bus 207, the MUX 205 to select one of the feeds 232. Typically, a feed 232 is a corresponding feed 242. However, a feed such as one created by using frames 231, which has information from feeds 242-1 and 242-2, can also be chosen by the MUX 205. For instance, the memory buffer 225 could be directed by the CIU control unit 215 to send frame 231 over the feed 232-1 in place of the frame 230-1.

The CIU control unit 215 directs the MUX 205 to select a feed 232 (e.g., or video from two or more of the feeds 232) in order to create a selected view 211 for the composite imaging unit 250 by using the N imaging units 240. A selected view 211 is received through the input 208. The input 208 could be a hardware connection, such as a bus or a network connection, or could be a software instruction, or some combination of these. Each of the imaging units 240 has a selected coverage region 255. Lines 272 and 273 illustrate a selected coverage region 255-1 for the imaging unit 240-1. Similarly, lines 275 and 276 illustrate a selected coverage region 255-2 for the imaging unit 240-2 and the lines 277 and 278 illustrate a selected coverage region 255-N for imaging unit 240-N. Furthermore, each imaging unit 240 also has a complete coverage region 260. The complete coverage region 260-1 for imaging unit 240-1 is demarcated by lines 271 and 273. The complete coverage region 260-1 for the imaging unit 240 is defined by at least by pan and tilt values for the pan-tilt unit 245-1 of the imaging unit 240-1 and may be defined by a zoom value (if any) for the imaging unit 240-1. The complete coverage region 260-2 is also defined by the pan and tilt values for the pan-tilt unit 245-2 of the imaging unit 240-2 and a zoom value (if any) of the imaging unit 240-2. The complete coverage region 260-2 is demarcated by lines 274 and 276. In the case of 240-N, there is no pan-tilt unit 245, so the complete coverage region 260-N is defined by a zoom value for the imaging unit 240-N. If there is no zoom value, then the complete coverage region 260-N is defined by the properties (e.g., resolution and optics) of the imaging unit 240-N.

The composite imaging system 200 has a complete CIU coverage region 280 that is defined by all of the complete coverage regions 260. It is to be noted that a complete CIU coverage region 280 for the composite imaging system 200 is considered herein to be a complete CIU coverage region 280 of the composite imaging unit 250. Similarly, a selected view 211 for the composite imaging system 200 is considered to be a selected view of the composite imaging unit 250. A selected view 211 corresponds to a portion (e.g., some or all) of the CIU coverage region 280. The composite imaging unit 250 also has any number of selected views 211, which are at least partially defined by one or more of the selected coverage regions 255. For instance, a selected view 211 for the composite imaging unit 250 could be one of the selected coverage regions 255 of one of the N imaging units 240 or a selected view 211 defined by both the selected coverage region 255-1 and selected coverage region 255-2. Typically, a selected view 211 for the composite imaging unit 250 will correlate with one or more of the selected coverage regions 255. However, this is not always the case. For instance, a selected view 211 that is defined to cause the composite imaging unit 250 visually cover a CIU selected coverage region 298 can be entirely visually covered by the selected coverage region 255-2, but only partially visually covered by the selected coverage region 255-1. Consequently, the imaging unit 240-2 will usually be selected for this particular selected view 211, but there may be times when the imaging unit 240-1 would be used, such as very fast movement of the object 299 into the region 279.

It is within the scope of the present invention to have the composite imaging unit 200 to have more than one output 206, e.g., a wide angle view of the entire complete coverage region and narrow angle view of a small object in the selected view.

Each of the selected views 211 for the composite imaging unit 250 will, in an exemplary embodiment, correspond to parameters 212, which typically comprise one or more of pan, tilt, and zoom values. Thus, the composite imaging unit 250 can be made to "act" like a single imaging unit even though the composite imaging unit 250 comprises N imaging units 240. Other selected views 211 are possible, however. For instance, a complete CIU coverage region 280 could be divided into M CIU selected coverage regions 298 for the composite imaging system 200. A selected view 211 would then correlate with one of the M CIU selected coverage regions 298 and a parameter would be used to select a selected view 211 corresponding to one of the M CIU selected coverage regions 298.

In the example of FIG. 2, the coverage regions (e.g., selected coverage regions 255 and complete coverage regions 260) are two-dimensional, but it is to be understood that the coverage regions may also be one- or three-dimensional. Additionally, selected views 211 may cause CIU selected coverage regions 298 to overlap.

The imaging units 240 in the above description may be co-located in a single mount (e.g., enclosure), may be mounted in separate enclosures but physically close to each other, or may be geographically distributed. Additionally, certain of the imaging units 240 may share the same optical sensor (e.g., a charge-coupled device). The sharing of the optical sensor may be provided by appropriate optics. Additionally, certain of the imaging units 240 may share the same optics s (e.g., a lens) by having an electronic switch and appropriate ray folding optics. Additionally, the imaging units 240 in the above description may each have one or more independent zoom units to offer visual coverage at one or more programmable or preset zoom resolutions. Moreover, the imaging units 240 may have independent pan-tilt units 245, as shown in FIG. 2, or two or more imaging unit 240 could share a pan-tilt unit 245.

Each imaging unit 240 can be configured in an off-line or a "just in time" mode to point to expected selected coverage region 255. In an off-line mode, an imaging unit 240 is configured to point to a selected coverage region 255 that typically does not change. In a just-in-time mode, which is a real-time mode, an imaging unit 240 is configured to point to an expected selected coverage region 255, such as if the composite imaging system 200 is tracking an object. All imaging units 240 need not be on all the time and can be powered only when needed. For faster switching times, one may keep all the imaging units 240 powered on all the time or perform a just-in-time powering-on (e.g., through imaging unit control 234) just before an imaging unit 240 needs to be switched on. All imaging units 240 can be either static imaging units (no movement of the selected coverage region 255 of the imaging unit 240) or active imaging units (with movement of the selected coverage region 255 of the imaging unit 240 through devices such as mechanical or electromechanical pan-tilt units).

The composite imaging system 200 has a number of applications. For instance, the composite imaging system 200 can be used in object tracking. In an illustrative embodiment, a just-in-time operation for the composite imaging unit 250 is performed by controlling the imaging units 240 so that the selected view 211 for the composite imaging unit 250 is changed to follow an object. As an example, the object 299 could be tracked. The CIU control unit 215 could analyze video from the feed coupling 236 and determine that the object 299 is currently in the selected coverage region 255-2 of the imaging unit 240-2 and make the selected view 211 of the composite imaging unit 250 be the selected coverage region 255-2 of the imaging unit 240-2. As the object 299 moves into area 279, the CIU control unit 215 can make the selected view 211 for the composite imaging unit 250 be the selected coverage region 255-1 of the imaging unit 240-1. Additionally, the CIU control unit 215 can send appropriate pan, tilt, and zoom values to the imaging unit 240-1 through the imaging unit control 234 before the object 299 gets into area 279 so that the imaging unit 240-1 has area 279 in the selected coverage region 255-1 of the imaging unit 240-1 before the object 299 gets into area 279. The CIU control unit 215 may also cause the imaging unit 240-2 to move toward line 274 by sending appropriate pan, tilt, and zoom values to the imaging unit 240-2 through the imaging unit control 234.

The above described just-in-time operation uses the CIU control unit 215 to process video (e.g., in a frame 230) from a feed 242. This kind of just-in-time operation is called "frame-based" prediction herein. Note that just-in-time does not have to rely on having the CIU control unit 215 to process video from a feed 242. The previous virtual motions of the composite imaging unit 200 can be used to infer an expected "point of interest" for near future times based exclusively on the past history of the "movement" of the composite imaging unit 250. In such situations also, spare imaging units 240 can be "lined up" just-in-time at the expected future position of the composite imaging unit 250. This kind of just-in-time operation is called "motion based" operation.

Both "frame-based" prediction and "motion-based" just-in-time operations can be fallible because the predicted location does not necessarily always represent the actual target location of interest. For this reason, it is advisable to use two or more predicted positions for capturing fast actions of the object and consequently selecting the actual feed 242 of interest based on (e.g., manual or automatic or combination thereof) inspection of content (e.g., such as by using frames 230) of the predicted feeds 242 available.

The CIU control unit 215 could also react to user input. For example, a user could provide selected views 211 (such as provided by pan, tilt, and zoom values as parameters 212 for the composite imaging unit 250) over input 208. As another example, a user could control a joystick that would provide an input (e.g. over input 208) to the CIU control unit 215 and the CIU control unit 215 would operate to control the MUX 205 and the composite imaging unit 250 in order to provide a selected view 211 determined from joystick input information.

As an additional example, the composite imaging system 200 can be made to track objects such as players. In this example, a user could choose a particular player and the control unit 215 then would track this player. In another example, an automatic tracking system, as part of CIU control unit 215, would display a number of choices of tracked objects (e.g., players) and a user would choose one of the tracked objects for further tracking for that player. The CIU control unit 215 could then track the selected tracked object.

Figure 3:
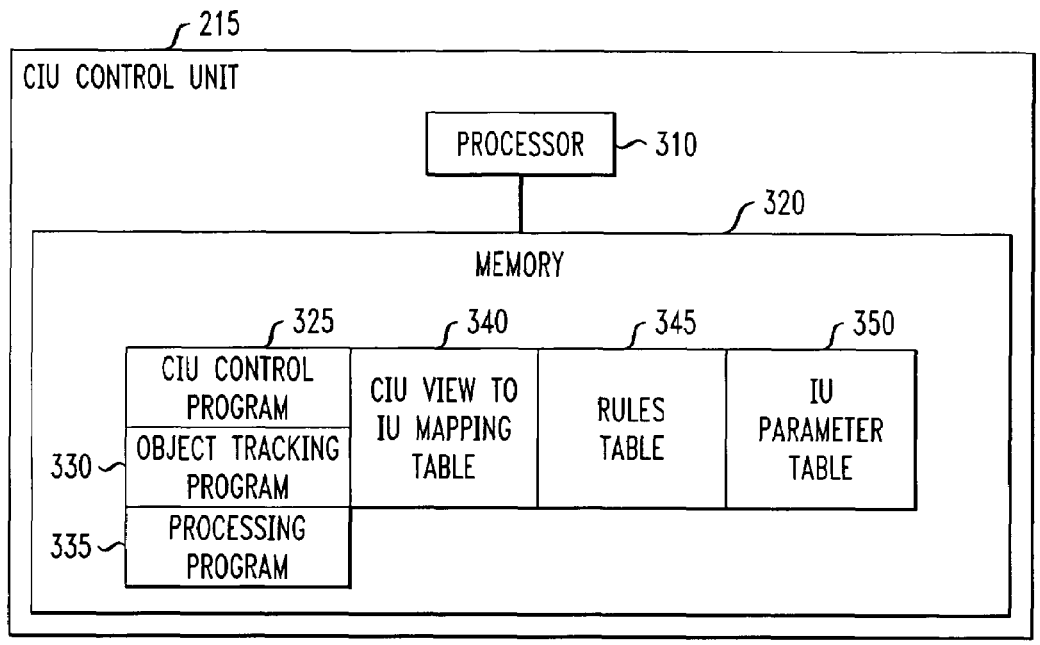
FIG. 3 is a block diagram of an exemplary composite imaging unit control unit, in accordance with an exemplary embodiment of the present invention.

Referring now to FIG. 3, an exemplary CIU control unit 215 is shown. The CIU control unit 215 comprises a processor 310 and a memory 320. The memory 320 comprises a CIU control program 325, an object tracking program 330, a processing program 335, a CIU view to IU mapping table 340, a rules table 345, and an Imaging Unit (IU) parameter table 350. Illustratively, the CIU control unit 215 can be a computer system, formed as part of all of an integrated circuit, or implemented as a programmable gate array. The CIU control program 325 performs functions such as controlling the MUX 205 (see FIG. 2) and the imaging units 240 based on the CIU view to IU mapping table 340, rules table 345, and IU parameter table 350.

The object tracking program 330, in an exemplary embodiment, uses techniques known to those skilled in the art in order to track one or more objects. The object tracking program 330 can produce information (not shown) suitable for the CIU control program 325 to use in order to control the imaging units 240 just-in-time to fully or partially automate the control inputs needed for CIU control unit 215. Note that any combination of the three components (object control unit program 325, object tracking program 330, and processing programs 335) can be eliminated in the system design (e.g., for cost reduction or simplicity of design) without departing from the spirit of this invention. Such modifications will result in less autonomic behavior of the system 200 and thus rely on the external input 206.

The processing program 335 can, in an exemplary embodiment, process frames of video (e.g., and audio if desired). For instance, the processing program 335 can remove camera motion jitter artifacts caused by camera motion. The camera motion blur may still exist but can be reduced or even eliminated using conventional methods (e.g., deconvolution). Because of more accurate speed estimates for a composite imaging unit 250 as opposed to a single imaging unit 240, better deconvolution is possible. The processing program 335 may also perform foreground segmentation (e.g., background subtraction). The processing program 335 can additionally process frames of video from two different imaging units 240 so that transfer from one selected view (as a selected coverage region 255 of one of the imaging units 240) of the composite imaging unit 250 to another selected view (as selected coverage region 255 of another of the imaging units 240) of the composite imaging unit 250 will be relatively seamless. The processing program 335 can also process individual frames of video from an imaging unit 240. For instance, the processing program 335 can center an object in a composite frame of video (like 231, for example, by selecting combinations of portions of individual video outputs 230-1, 230-2) that is then sent through MUX 205.

If the CIU control unit 215 is implemented as a computer system (or a portion thereof), the CIU control program 325 could be implemented as a control Application Programming Interface (API). Consequently, a system that interacts with the composite imaging system 200 through the input 208 could operate through a video API that supplies selected views 211 to the composite imaging system 200. In an exemplary embodiment, the selected views 211 are the parameters 212 of one or more of pan, tilt, and zoom. The composite imaging system 200 therefore can "act," through the video API, as a single pan-tilt-zoom imaging unit. It should be noted that the composite imaging system 200 could be housed in a separate system that also provides the input 208 using any combination of automatic and manual processes.

The CIU control unit 215 could operate in the following exemplary way. The object tracking program 330 could be tracking an object. The CIU control program 325 will set a selected view of the composite imaging unit 250 so that the output of the MUX 205 includes video (from one of the imaging units 240) including the object. To set the selected view, the CIU control program 325 consults the CIU view to IU mapping table 340, which is used to determine which imaging units 240 may be used to view the selected view of the composite imaging unit 250. An exemplary CIU view to IU mapping table 340 is shown in FIG. 6. The CIU control program 325 can use the rules table 345 to determine whether rules should be applied in order to determine, for example, which of the imaging units 240 should be selected. Rules may also be determined real-time, as described in more detail below. An exemplary rules table 345 is shown in FIG. 7. Once one or more of the imaging units 240 has been chosen, the processing program 335 can determine what parameters to send to the selected imaging units 240 by consulting the IU parameter table 350. An example of an IU parameter table 350 is shown in FIG. 8.

In a just-in-time scenario, one or more of the imaging units 240 are imaging units having pan-tilt unit 245 and perhaps zoom capability. The object tracking program 330 tracks objects of interest. Typically, there is economic need for controlling a limited number of imaging units 240 and thus reducing the number of imaging units 240 necessary to view a CIU selected coverage region 298. One technique performed by the CIU control unit 215 is as follows: (a) find the coordinates of an object as well as the velocity of the object in the present imaging unit 240; (b) extrapolate the time when the object will be (e.g., just) about to leave the view of the present imaging unit 240; (c) find the target coordinates of the region where one would like to point another imaging unit 240 as well as at what precise time the imaging unit 240 should be pointing at that region; (d) find a spare imaging unit 240 (in general, one or more spare imaging units 240 are found); (e) determine the effective pan, tilt, and zoom values of the spare imaging unit 240 to physically maneuver the spare imaging unit 240 so that the spare imaging unit 240 visually covers the target coordinates before the precise time; (f) send the determined pan, tilt, and zoom values to the spare imaging unit 240; and (g) at the precise time, switch the video feed from present unit to the spare unit using appropriate MUX control.

The CIU view to IU mapping table 340 can provide mapping from selected views 211 of the composite imaging system 200 to coordinate ranges. In this manner, in step (c) above, the selected view 211 is then used to determine which of the imaging units 240 can visually cover the target coordinates. In step (d), the CIU view to IU mapping table 340 can be used to determine which of the imaging units 240 that can visually cover the target coordinates is also a spare imaging unit 240. As described before, more than one feed 242 can also be used to obtained a desired output and in such situations more than one spare imaging unit 240 is selected and the multiple imaging units 240 are communicated appropriate control parameters to orient the multiple imaging units 240 in appropriate pose and zooms from their corresponding IU parameter table (see FIG. 8).

At least a portion (e.g., some or all) of the present invention may be implemented as an article of manufacture. The article of manufacture comprises a computer readable medium containing one or more programs which when executed implement steps to perform a portion of the present invention.

Figure 4:
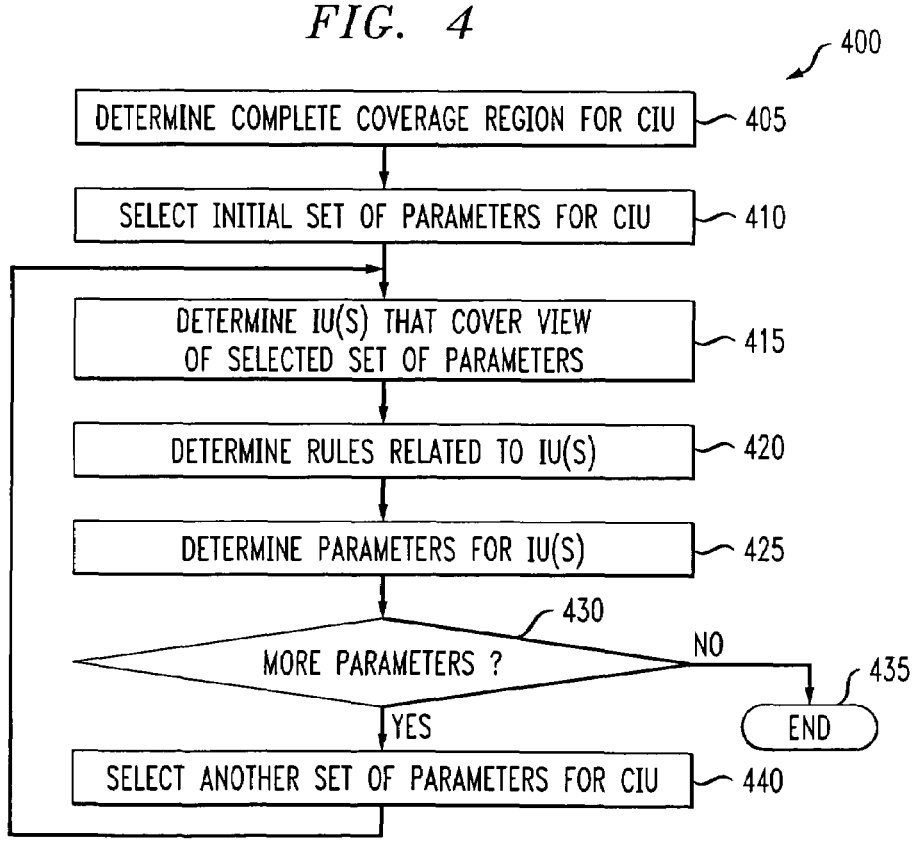
FIG. 4 is a flow diagram of a method for training involving a composite imaging unit, in accordance with an exemplary embodiment of the present invention.

Referring now to FIG. 4, a method 400 is shown for training involving a composite imaging unit 250. Method 400 is used to determine a complete CIU coverage region 280 of the composite imaging unit 250 and to determine sets of parameters for the composite imaging system 200 for use when setting the composite imaging unit 250 to selected views of the composite imaging system 200. Method 400 can be performed by composite imaging system 200 of FIG. 2, and will typically involve some type of action by an operator of the composite imaging system 200. For instance, an operator might select various imaging units 240 that are able to visually cover a portion of a selected view of the composite imaging unit 250.

Method 400 begins in step 405 when a complete CIU coverage region 280 is determined for the composite imaging unit 250 of the composite imaging system 200. This step is typically performed by setting each of the imaging units 240 to a number of selected coverage regions 255 and determining what region is able to be visually covered by the imaging units 240 that define the composite imaging unit 250.

In step 410, an initial set of parameters for the composite imaging unit 250 is selected. The parameters are used to define how an overall video output 206 should look like when there is a choice of different solutions available satisfying requirements of a given selected view 211 on input 208. Typically, in step 410, a "center selected view" policy for the composite imaging unit 250 would be chosen, so that composite imaging system 200 would strive for a view with the object of interest in the center of the video on output 206 of the composite imaging unit 250. However, selecting a center selected view is not necessary. Additionally, although the methods herein described using parameters of the composite imaging unit 250 to define a selected view of the composite imaging unit 250, the selected view itself is all that might be needed. Thus, a selected view of "a view of a certain area" or "selected view #10" could be used to determine which feeds of the imaging units 240 are to be selected in order to output video having that selected view or a portion thereof. Nonetheless, the use of parameters for the composite imaging unit 250 is beneficial, as then a composite imaging system 200 could act, from outside appearances, as single imaging unit 240 having a single pan-tilt unit 245 and a zoom control.

In step 415, it is determined which of the imaging units 240 will visually cover a portion (e.g., all or some) of the selected view for the composite imaging unit 250. In step 415, information is stored that indicates which of the imaging units 240 will visually cover a portion (e.g., all or some) of the selected view for the composite imaging unit 250. This information might be stored in a CIU view to IU mapping table 340, for instance.

In step 420, rules are determined for the imaging units 240. This step is useful, for example, when there is a choice of image units to select among multiple available imaging units. For instance, the resolution for such situations can be performed using a rule such as "select the imaging unit 240 having the smallest angle for its selected coverage region 255 relative to the selected coverage region of the complete CIU coverage region 280." Thus, an imaging unit 240 having pan and tilt values near zero could be selected for the selected coverage region of the complete CIU coverage region 280. Furthermore, sometimes an application controlling the composite imaging system 200 needs a particular view of an object (e.g., frontal view of face for face recognition; top-down strategic view of a football player). So, a general rule for this situation is as follows: given the pose of the object (e.g., by an automatic or manual tracking system) and given the view needed by the application, select the imaging unit 240 that can most easily accommodate the application requirement. Other rules are described in more detail below. The rules are stored in step 420, such as in a rules table 345.

In step 425, the parameters (e.g., pan, tilt, zoom) are determined for each of the imaging units 240 in the set of imaging units 240 that will visually cover a portion (e.g., all or some) of the selected view for the composite imaging unit 250. The parameters could be determined based on a single set of parameters for each of the imaging units 240, such that for a certain imaging unit 240 values of 10 degrees pan, 15 degrees tilt, and 0 zoom level are used for the certain imaging unit 240. Additionally, each set of parameters could have a range for each of the parameters, such that for a certain imaging unit 240 a values of 10–15 degrees pan, 15–17 degrees tilt, and 1–2 zoom level are used for the certain imaging unit 240. Zoom levels are typically given in values of 1–16. The parameters may also be determined based on rules. For instance, a Rule A might have associated with the rule certain parameters for Imaging Unit A, while Rule B might have associated with the rule different parameters for Imaging Unit A. The parameters are stored in step 420, typically in a table such as the IU parameter table shown in FIG. 8.

In step 430, it is determined if there are more parameters defining more selected views for the composite imaging unit 250. If not (step 430=NO), method 400 ends in step 435. If there are more parameters (step 430=YES), the method continues in step 440, when another set of parameters, defining another selected view of the composite imaging unit 250, is determined. Steps 415 through 430 and step 440 are performed until no more parameters are to be determined.

Figure 5:
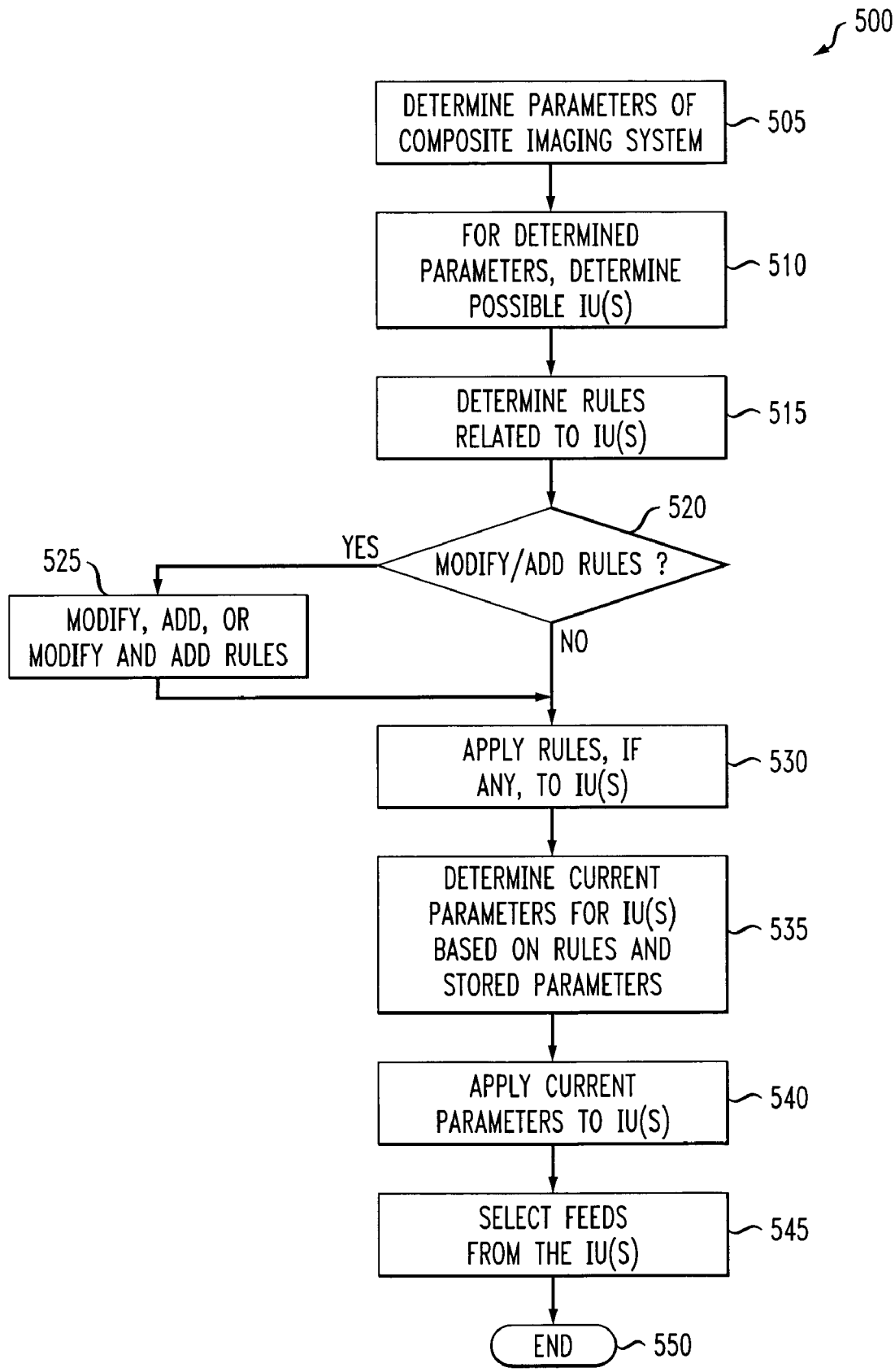
FIG. 5 is a flow diagram of a method for controlling a composite imaging unit, in accordance with an exemplary embodiment of the present invention.

FIG. 5 shows a method 500 for controlling a composite imaging unit 250, in accordance with an exemplary embodiment of the present invention. Method 500 is performed by a composite imaging system 200. Method 500 begins in step 505 when parameters for the composite imaging system 200 are determined. As previously described, the parameters for the composite imaging system 200 define a selected view for the composite imaging system 200. The selected view is a portion (e.g., all or some) of a region able to be visually covered by the imaging units 240 of the composite imaging unit 250. In step 510, the possible imaging units 240 able to visually cover a portion of the selected view are determined. This step is typically performed by accessing a CIU view to IU mapping table, an exemplary table of which is shown in FIG. 6; however, any technique for determining which imaging units 240 are suitable to visually cover a selected view for the composite imaging system 200 may be used.

In step 515, rules are determined that are related to the imaging units 240 from step 510. Typically, step 515 is performed by accessing a rules table, an exemplary table of which is shown in FIG. 7. In step 520, a decision is made as to whether rules should be modified or determined in real-time. Such modifications or determinations might take place for (e.g., automatic) object tracking systems, changing lighting conditions, changing application interest (e.g., during the last quarter of a game), for example. If rules are to be modified or new rules added (step 520=YES), step 525 is performed. In step 525, rules are modified, new rules are added, or both. The policy of how to add or modify the rules is provided by the system designer and can be any combination of manual (e.g., soliciting user input/selection) and automatic processes (e.g., if illumination is low, override the close-up views with corresponding wide angle views). If the rules are not to be modified or new rules added (step 520=NO), then step 530 is performed. Step 530 is also performed after step 525. In step 530, the rules are applied, typically to select one or more of the determined imaging units 240.

In step 535, the current parameters for the selected imaging units 240 (i.e., the imaging unit 240 selected in step 530) are determined. Typically, step 535 is performed by accessing an IU parameter table, an exemplary table of which is shown in FIG. 8. The current parameters may also be influenced or set by the rules in step 535 (e.g., always use lowest zoom if the object speed is higher than 500 pixels per second). In step 540, the current parameters are applied to the one or more selected imaging units 240.

In step 545, a feed or feeds 232 for the one or more imaging units 240 are selected and output. Generally, the MUX 205 selects a single feed 232 (see FIG. 2), but a single feed might have video from more than one feed 242, as described above. Additionally, a MUX 205 could be made to create one output from two or more feeds 242, if desired. In step 550, method 500 ends.

It should be noted that method 500 may also be performed, in an exemplary embodiment, without determining which imaging units 240 are to be used. For instance, a particular selected view 211 could be correlated with one or more feeds 242 (e.g., or feeds 232), and the one or more feeds 242 (e.g., or feeds 232) would be selected whenever the particular selected view 211 is selected.

Although this invention describes by the way of example a system with single output 206, it is within the scope of our invention to have the composite imaging unit 200 to have more than one output 206, e.g., a wide angle view of the entire complete coverage region and narrow angle view of the a small object in the selected view. It is conceivable that the process 500 is run for each instance of an output with additional rules for conflict resolution when two outputs require common resources to accomplish an acceptable solution.

Note that processing may also take place in method 500. For instance, after step 540, frames 230 from two feeds 242 could be combined or processed through other techniques.

Referring now to FIG. 6, an exemplary CUI view to imaging unit mapping table 700 is shown. CIU view to IU mapping table 700 comprises M entries 630, each entry 630 comprising parameters 610 for a composite imaging system 200 and corresponding imaging units 240 in a composite imaging unit 250. In this example, the parameters 610 for the composite imaging system 200 comprise one or more of pan values, tilt values, and zoom values. Additional parameters, such as whether an imaging unit 240 should be on or off could also be stored.

In the example of FIG. 6, for the parameters 610-1, three available imaging units 240 of IU1, IU2, and IU3 are able to visually cover a portion (e.g., all or some) of the selected view of the composite imaging system 200 defined by the parameters 610-1. For parameters 610-2, the sole available imaging unit 240 is IU2. For the parameters 610-M, the available imaging units 240 are the imaging units IU4, IU5, and IU6.

FIG. 7 shows an exemplary rules table 700. Rules table has a single entry 730 in this example, and entry 730 corresponds to parameters 610-1. There are three rules 710-1 through 710-3 for the selected view (defined by the parameters 610-1) of the composite imaging system 200. The rule 710-1 states that if an object is moving toward a selected view for the composite imaging unit 250 of pan between A to B, then the imaging unit 240 of IU1 should be selected. Rule 710-2 states that if an object is moving toward a selected view for the composite imaging unit 250 of pan not between A to B and tilt between C to D, then imaging unit 240 of IU3 should be selected. Rule 710-3 states that if the rules 710-1 and 710-2 are not met, then imaging unit 240 of IU2 should be selected. Note that rules for other parameters 610 are not shown.

Turning now to FIG. 8, this figure shows an exemplary IU parameter table. Again, only a single entry 840 is shown, which corresponds to parameters 610-1. In this example, there are current parameters 810, 830, and 840 for each of the imaging units 240 of IU1, IU2, and IU3, respectively. In this example, the imaging unit 240 of IU1 and IU2 are imaging units including pan-tilt units 245, but the imaging unit 240 of IU3 does not include a pan-tilt unit 245.

It should be noted that the tables shown in FIGS. 6 through 8 can be combined or different tables could be used.

It is to be understood that the embodiments and variations shown and described herein are merely illustrative of the principles of this invention and that various modifications may be implemented by those skilled in the art without departing from the scope and spirit of the invention.

What is claimed is:

1. A method for controlling views from a plurality of imaging units, each imaging unit outputting a feed comprising video, the method comprising the steps of:
   determining a set of parameters defining a given selected view of a region able to be visually covered by the plurality of imaging units, the given selected view being one of a plurality of predetermined selected views of the region, each of the plurality of selected views corresponding to a portion of the region and to one or more of the imaging units able to visually cover the portion of the region, wherein each selected view is defined by a corresponding set of parameters;
   determining which of the one or more feeds correspond to the given selected view; and
   outputting the one or more feeds that correspond to the given selected view.

2. The method of claim 1, wherein each of the plurality of imaging units comprises one or more of an infrared camera, a thermal camera, an ultrasonic camera, and a video camera.

3. The method of claim 1, wherein the one or more parameters comprise one or more of pan, tilt, and zoom.

4. The method of claim 3, wherein values for the one or more of pan, tilt, and zoom are specified in absolute terms or in terms of relative values from existing values for the one or more of pan, tilt, zoom.

5. The method of claim 3, wherein the one or more values are specified by any combination of manual and automatic systems.

6. The method of claim 1, wherein:
   the given selected view is a first selected view;
   the portion of the region corresponding to the first selected view is a first portion of the region;
   the one or more feeds that correspond to the first selected view are one or more first feeds;
   the step of determining a set of parameters further comprises the step of determining a second set of parameters defining a second view of the region, the second selected view corresponding to a second portion of the region; and
   the step of determining which of the one or more feeds further comprises the step of determining which of one or more second feeds correspond to the second selected view.

7. The method of claim 6, wherein the one or more second feeds are determined and output after the one or more first feeds are determined and output, such that an overall sequence of video frames on the first and second selected feeds corresponds to a sequence of first and second selected views.

8. The method of claim 7, wherein a sequence of sets of parameters defining the sequence of selected views is received from any combination of manual or automatic systems.

9. The method of claim 1, wherein the set of parameters is defined as one part of a plurality of parts of the region.

10. The method of claim 1, wherein the step of determining a set of parameters further comprises the step of receiving the parameters.

11. The method of claim 1, wherein:
    the method further comprises the step of tracking one or more objects in the region;
    the step of determining a set of parameters further comprises the step of determining a set of parameters such that the one or more objects are present in video on the one or more feeds to be output.

12. The method of claim 1, wherein:
    the method further comprises the step of combining video frames from two or more feeds into a given feed; and
    the step of determining which of the one or more feeds further comprises the step of determining that the given feed corresponds to the given selected view.

13. The method of claim 1, further comprising the step of controlling the one or more imaging units so that the one or more imaging units visually cover the at least part of the portion of the region.

14. The method of claim 13, wherein the step of controlling the one or more imaging units further comprises the steps of selecting a set of second parameters for each of the one or more imaging units and communicating a set of second parameters to a corresponding one of the imaging units.

15. The method of claim 14, where each set of second parameters comprises values for one or more of pan, tilt, and zoom.

16. The method of claim 13, further comprising the step of turning on one or more of the given imaging units.

17. The method of claim 1, wherein the step of determining which of the one or more feeds correspond to the given selected view further comprises the step of determining one or more given imaging units that correspond to the selected view.

18. The method of claim 17, wherein:
    the step of determining one or more given imaging units that correspond to the selected view further comprises the steps of:
       selecting one of the one or more given imaging units;
       determining one or more stored rules applicable to the selected given imaging unit;
       using the one or more stored rules to determine second parameters associated with the selected given imaging unit; and
       communicating the determined second parameters to the selected given imaging unit; and
       determining that a feed corresponding to the selected given imaging unit corresponds to the given selected view.

19. The method of claim 17, wherein:
    there are at least two given imaging units;
    the step of determining which of the one or more feeds correspond to the given selected view further comprises the steps of:
       determining one or more rules applicable to the at least two given imaging units;
       using the one or more rules to select one of the at least two given imaging units; and
       determining that a feed corresponding to the selected one of the at least two given imaging units corresponds to the given selected view.

20. The method of claim 17, wherein the step of determining one or more given imaging units that correspond to the selected view further comprises the steps of:
    determining whether one or more real-time rules apply to the one or more given imaging units; and applying the one or more real-time rules when the one or more real-time rules apply to the one or more given imaging units.

21. The method of claim 20, wherein:
the method further comprises the step of determining whether the one or more stored rules correspond to the one or more given imaging units; and
the step of applying further comprises the step of applying the one or more real-time rules and the one or more stored rules when the one or more real-time rules apply to the one or more given imaging units and the one or more stored rules correspond to the one or more given imaging units.

22. The method of claim 17, wherein the step of determining one or more given imaging units that correspond to the selected view further comprises the step of determining parameters for each of the one or more given imaging units that correspond to the selected view.

23. The method of claim 1, wherein each selected view corresponds to a range of coordinates, the range of coordinates defining the portion of the region.

24. The method of claim 1, wherein two or more of the plurality of imaging units share an optical sensor.

25. The method of claim 1, wherein the plurality of imaging units are co-located in a single enclosure, are mounted in separate enclosures but located physically close to each other, or are geographically distributed.

26. A system for controlling views from a plurality of imaging units, the system comprising:
the plurality of imaging units, each imaging unit outputting a feed comprising video; and
a control unit coupled to the plurality of imaging units and operative to:
determine a set of parameters defining a given selected view of a region able to be visually covered by the plurality of imaging units, the given selected view being one of a plurality of predetermined selected views of the region, each of the plurality of selected views corresponding to a portion of the region and to one or more of the imaging units able to visually cover the portion of the region, wherein each selected view is defined by a corresponding set of parameters;
determine which of the one or more feeds correspond to the given selected view; and
output the one or more feeds that correspond to the given selected view.

27. The system of claim 26, wherein:
the system further comprises a multiplexer comprising a plurality of inputs, a control bus, and an output, the control bus coupled to the control unit, each of the plurality of inputs coupled to one of the feeds, the multiplexer adapted to route, based on a value on the control bus, the one or more feeds to the output; and
wherein the control unit is further operative to provide the value to the control bus so that the multiplexer routes the one or more feeds to the output.

28. The system of claim 27, wherein:
the system further comprises one or more memories coupled to the control unit;
the one or more memories are also coupled to the feeds and to the multiplexer;
the one or more memories further comprise video frames from two or more of the feeds and a process;
the process combines the video from the two or more feeds into a given feed that is coupled to the multiplexer; and
the control unit is further operative to provide a value to the multiplexer so that the multiplexer routes the given feed to the output.

29. An article of manufacture for controlling views from a plurality of imaging units, each imaging unit outputting a feed comprising video, the article of manufacture comprising:
a computer readable medium containing one or more programs which when executed implement the steps of:
determine a set of parameters defining a given selected view of a region able to be visually covered by the plurality of imaging units, the given selected view being one of a plurality of predetermined selected views of the region, each of the plurality of selected views corresponding to a portion of the region and to one or more of the imaging units able to visually cover the portion of the region, wherein each selected view is defined by a corresponding set of parameters;
determining which of the one or more feeds correspond to the given selected view; and
outputting the one or more feeds that correspond to the given selected view.

* * * * *